(12) United States Patent
Manneschi

(10) Patent No.: US 10,908,315 B2
(45) Date of Patent: Feb. 2, 2021

(54) INSPECTION OF A SHOE WITH A THERMAL CAMERA

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 229 days.

(21) Appl. No.: 16/158,934

(22) Filed: Oct. 12, 2018

(65) Prior Publication Data
US 2019/0196002 A1   Jun. 27, 2019

(30) Foreign Application Priority Data

Oct. 13, 2017 (FR) ...................................... 17 59628

(51) Int. Cl.
*G01V 8/00* (2006.01)
*G01V 11/00* (2006.01)
*A43D 1/02* (2006.01)
*G01S 13/88* (2006.01)
*G01B 21/08* (2006.01)

(52) U.S. Cl.
CPC ............. *G01V 8/005* (2013.01); *A43D 1/025* (2013.01); *G01B 21/085* (2013.01); *G01S 13/887* (2013.01); *G01V 11/00* (2013.01); *G05B 2219/37426* (2013.01)

(58) Field of Classification Search
CPC .................. G01V 8/005; G01B 21/085; G05B 2219/37426; G01S 13/887
USPC ............................. 33/3 A; 340/573.1; 342/22
See application file for complete search history.

(56) References Cited

U.S. PATENT DOCUMENTS

| | | | | |
|---|---|---|---|---|
| 6,057,761 | A * | 5/2000 | Yukl ..................... | A61B 5/0507 250/358.1 |
| 6,549,639 | B1 * | 4/2003 | Genest .................... | A43D 1/025 382/100 |
| 6,975,232 | B1 * | 12/2005 | McKenna ............... | A43D 1/025 340/573.1 |
| 9,715,012 | B2 * | 7/2017 | Fernandes ............... | G01S 13/89 |
| 2005/0116825 | A1 | 6/2005 | Manneschi | |
| 2006/0017605 | A1 * | 1/2006 | Lovberg ................. | G01K 7/226 342/22 |

(Continued)

FOREIGN PATENT DOCUMENTS

| | | |
|---|---|---|
| EP | 1574879 A1 | 9/2005 |
| EP | 2202700 A1 | 6/2010 |

(Continued)

OTHER PUBLICATIONS

French Search Report and Written Opinion for FR1759628, dated Jun. 15, 2018, pp. 1-6.

*Primary Examiner* — Christopher W Fulton
(74) *Attorney, Agent, or Firm* — Lerner, David, Littenberg, Krumholz & Mentlik, LLP

(57) ABSTRACT

The invention relates to an inspection method of a shoe worn by a foot of an individual comprising the following steps:

acquiring (S1) a thermal image of the shoe when it is worn by a foot of the individual by means of a thermal camera, determining (S2), from the thermal image of the shoe, a lower limit of the foot of the individual, determining (S3) a position of the shoe relative to the thermal camera at the time of acquisition of the thermal image, and deducing (S4) of the position of the shoe relative to the camera and of the lower limit of the foot, a distance between the lower face of the sole and the lower face of the foot of the individual.

22 Claims, 14 Drawing Sheets

(56) References Cited

U.S. PATENT DOCUMENTS

| | | | |
|---|---|---|---|
| 2007/0073492 A1* | 3/2007 | Manneschi | G01V 3/12 |
| | | | 702/25 |
| 2007/0235652 A1 | 10/2007 | Smith | |
| 2010/0123571 A1 | 5/2010 | Crowley et al. | |
| 2011/0026674 A1* | 2/2011 | Rothschild | G01V 5/0016 |
| | | | 378/57 |
| 2011/0129063 A1* | 6/2011 | Bendahan | G01V 5/0016 |
| | | | 378/57 |
| 2012/0175521 A1* | 7/2012 | Chawla | G01J 3/10 |
| | | | 250/339.02 |
| 2012/0314836 A1* | 12/2012 | Smith | G01V 5/0025 |
| | | | 378/57 |
| 2014/0320331 A1 | 10/2014 | Fernandes et al. | |
| 2015/0369756 A1 | 12/2015 | Rezgui et al. | |
| 2017/0169571 A1* | 6/2017 | Hung | A61B 5/1074 |
| 2017/0343666 A1* | 11/2017 | Manneschi | G01V 3/12 |
| 2019/0391531 A1* | 12/2019 | Qi | G01V 9/00 |

FOREIGN PATENT DOCUMENTS

| | | |
|---|---|---|
| FR | 2860631 A1 | 4/2005 |
| FR | 2889338 A1 | 2/2007 |
| FR | 2911212 A1 | 7/2008 |
| FR | 2950976 A1 | 4/2011 |
| FR | 3050284 A1 | 10/2017 |

* cited by examiner

FIG. 3e
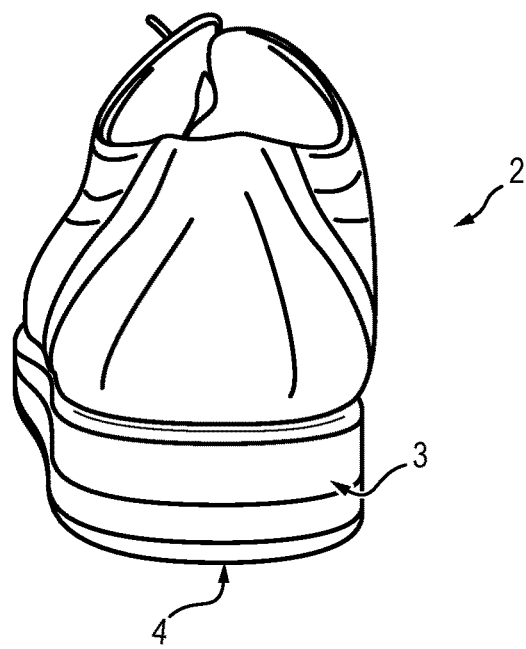
FIG. 3f
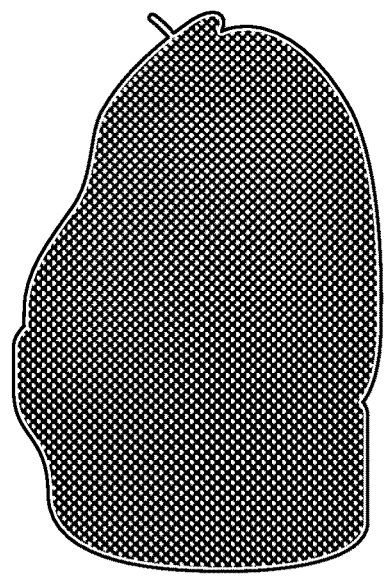 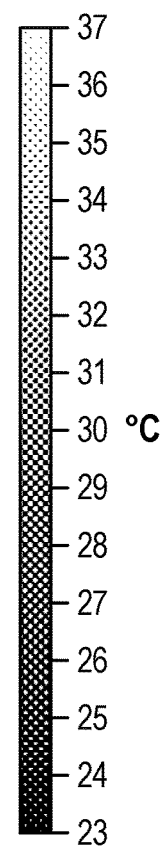

INSPECTION OF A SHOE WITH A THERMAL CAMERA

FIELD OF THE INVENTION

The present invention relates to the field of detectors designed for detection of objects or materials not authorised in a protected access zone.

TECHNOLOGICAL BACKGROUND

Today it seems necessary to highly reliably control attempts to introduce or take out specific products, for example but not exclusively explosive materials, in or outside a sensitive zone.

The problem raised here covers a very wide range of situations, which encompasses especially and non☐limiting the attempt to introduce products in a protected zone, such as a shop, school, train station, a public or even private body, or the attempt to take products outside a defined perimeter, for example in the event of company theft or at a protected site.

For several years, body scanners have been developed to detect arms, explosives, etc. hidden under clothing of individuals entering a protected zone. All these systems utilize technologies based on the detection of radiation energies modulated or emitted by the body of the inspected individuals. Radiation energies used in this way include X☐rays, microwaves, millimetric waves, infrared light, terahertz waves and ultrasound.

Despite the use of several types of radiation energies and imaging geometries, the principle of all these body scanners is the creation of an electronic image of the individual on which the clothing of the individual is transparent. This image is then displayed on a monitor and viewed by an operator so that the latter determines whether the individual is carrying a target object. For this, the operator, who is trained in detection of target objects, must be capable of determining if those objects identified by the body scanner correspond to the human anatomy, to an authorized object such as a lighter, a handkerchief or other pieces, or to a target object such as a weapon or an explosive.

It eventuates these days that individuals who try to fraudulently bring a product outside a protected zone or who try to introduce such a product, often use shoes to conceal the product in question. This phenomenon essentially seems due to the fact that this zone is difficult to control visually or by manual touch.

Yet it seems that conventional body scanners are incapable of detecting such products, due to the thickness of the upper of the shoe which forms a shield and on the basis of current technologies does not determine the shape of the foot and therefore identify target objects.

This is why it happens that operators require individuals wanting to enter or exit a sensitive zone to take their shoes off, in an attempt to improve inspection. But despite constraints and discomfort resulting from such a situation, a visual examination of the removed shoe does not always fully secure inspection. The operator cannot in fact determine if an object or a material is not camouflaged in an internal cavity not directly accessible from the shoe, especially the sole of the latter.

The applicant has therefore proposed devices of the type illustrated in the attached FIG. 1, which comprise a frame which comprises:
  a base 10 formed by a rectangular board in the form of a step whereof the plane upper surface comprises a design or print 12 and a stop 14 intended to receive and position a single foot of an individual covered by a shoe,
  two symmetrical lateral panels 20 which house detection means, and
  an information module 30.

Documents FR 2 860 631, EP 1 574 879, FR 2 889 338 and FR 2 911 212 disclose examples of the device illustrated in FIG. 1.

The detection means described in the documents mentioned can be formed by windings for detection of metals, sampling means, for example in the form of suction nozzles, for drawing off steam or traces of particles, for example drugs or explosives, analysis means based on nuclear magnetic resonance comprising for example Helmholtz coils, or again complex impedance analysis means or radioactive radiation detectors.

Document US 2014/0320331 as such proposes adding to a conventional body scanner a baseplate equipped with an array of antennas emitting electromagnetic waves in the direction of the upper wall of the baseplate. The electromagnetic waves are reflected towards the interior of the baseplate by the shoe so they can be received by the antennas. A processor is capable of detecting the presence of target objects in the shoe.

This device accordingly improves the detection of target objects when they are hidden in shoes. But this detection seems to be limited when the target objects comprise a dielectrical, such as an explosive, which is positioned according to a constant thickness in the shoe. The detector cannot in fact distinguish the response obtained by the antennas when the shoe has a thick sole and that obtained when the sole is fine but is covered by a constant thickness of explosives.

SUMMARY OF THE INVENTION

An aim of the invention is therefore to propose novel detection means for improving the detection of target objects, such as objects or materials not authorised in a protected access zone, likely to be camouflaged in a shoe.

For this, the invention proposes an inspection method of a shoe worn by a foot of an individual, the shoe comprising a sole comprising a lower face intended to come into contact with a floor, and the method comprising the following steps:
  acquiring a thermal image of the shoe when it is worn by a foot of the individual by means of a thermal camera,
  determining, from the thermal image of the shoe, a lower limit of the foot of the individual, said lower limit corresponding to a lower face of the foot,
  determining a position of the shoe relative to the thermal camera at the time of acquisition of the thermal image, and
  deducing of the position of the shoe relative to the camera and of the lower limit of the foot, a distance between the lower face of the sole and the lower face of the foot of the individual.

Some preferred, though nonlimiting, characteristics of the inspection method defined hereinabove are the following, taken individually or in combination:
  during the acquisition step of the thermal image, the thermal camera is oriented in the direction of the heel of the foot of the individual such that the thermal image obtained comprises said heel.
  the thermal image is a bidimensional matrix comprising N lines of pixels and M columns of pixels, in which a value of radiation intensity corresponds to each pixel.

the step for determining the limit comprises the following sub-steps: for the N lines of pixels, calculating an average of the values of the pixels belonging to the same line to obtain a column of N averaged pixels, calculating a derivative of the averaged pixels and identifying the pixel corresponding to the peak of the derivatives calculated in this way.

the deduction step of the distance comprises a sub-step during which the averaged pixel whereof the value is the lowest is identified.

the deduction step of the distance also comprises the following sub-steps: calculating a difference in multiples of pixel between the pixel corresponding to the peak of the derivatives and the averaged pixel whereof the value is the lowest, determining a linear factor, as a function of the position of the shoe relative to the thermal camera and multiplying the difference obtained in this way by the linear factor the peak of the derivatives is determined among the derivatives corresponding to the pixels extending between the averaged pixel whereof the value is the lowest and the averaged pixels extending above said averaged pixel whereof the value is the lowest.

the method also comprises a sub-step during which a low-pass filter is applied to the averaged pixels prior to calculating their derivative.

the method also comprises the following steps: detecting stratification by vertical stacking, in the sole, by detection of successive echoes following emission of waves towards the sole, standardizing the stratification detected in this way from the distance between the lower face of the foot and the lower face of the sole obtained during the deduction step and comparing the value of the stratification standardized in this way with an alarm threshold and triggering an alarm in case it is exceeded.

the method also comprises the following steps: detecting stratification by vertical stacking, in the sole, by detection of successive echoes following emission of waves towards the sole, identifying among the successive echoes the echo of higher amplitude, determining a transmission and reflection time of the echo of higher amplitude by deducing a height between the stratification corresponding to the echo of higher amplitude and the lower face of the sole and comparing the height deduced in this way with the distance between the lower face of the foot and the lower face of the sole obtained during the deduction step and, if needed, triggering an alarm.

the method also comprises the following steps: measuring electrical capacitance formed by the sole of the shoe placed on the base, standardizing the electrical capacitance measured in this way from the distance between the lower face of the foot and the lower face of the sole obtained during the deduction step and comparing the value of the electrical capacitance standardized in this way with an alarm threshold and triggering an alarm in case it is exceeded.

the method also comprises the following steps: measuring electrical capacitance formed by the sole of the shoe placed on the base, by deducing a height between the lower face of the foot and the lower face of the sole and comparing the height deduced in this way with the distance between the lower face of the foot and the lower face of the sole obtained during the deduction step and, if needed, triggering an alarm.

According to a second aspect, the invention also proposes a system for inspection of a shoe comprising a sole, when the shoe is worn by an individual, the system comprising:
a base configured to receive at least one foot of an individual covered by the shoe,
a thermal camera configured to acquire a thermal image of the shoe worn by the individual,
means configured to determine a position of the shoe relative to the thermal camera and
a processor configured to determine, from the thermal image of the shoe, a lower limit of the foot of the individual, said lower limit corresponding to a lower face of the foot, and deducing of the position of the shoe relative to the thermal camera and of the lower limit of the foot, a distance between the lower face of the sole and the lower face of the foot of the individual.

Some preferred, though nonlimiting, characteristics of the inspection system defined hereinabove are the following, taken individually or in combination:
the thermal camera is fixed to the base so as to acquire an image of a heel of the shoe.
the system is configured to inspect two shoes worn by an individual and comprises two thermal cameras, each camera being configured to acquire an image of one of the shoes.
the thermal camera is sensitive to waves having wavelengths of the order of tens of micrometers, preferably between eight micrometers and fourteen micrometers.
when the base is placed on a floor, an angular field of the thermal camera in a plane perpendicular to the floor is larger than an angular field of the thermal camera according to a horizontal plane parallel to the floor.
the thermal image is a bidimensional matrix comprising N lines of pixels and M columns of pixels, where N is greater than M.
the means configured to determine the position of the shoe relative to the infrared camera comprise one at least following elements: a mechanical stop that is fixed relative to the thermal camera and configured to come into contact with a part of the shoe during the inspection, a visual marking, a set of photoelectric cells configured to send and/or receive an optic beam, said set being fixed on two walls opposite the system configured to be positioned on either side of the shoe, an array of antennas configured to send and/or receive a magnetic field, said array being fixed in a baseplate of the system and/or at least one infrared sender and an infrared receiver and a device for analysing the round trip time of infrared waves between the sender and the receiver.

According to a third aspect, the invention proposes a set of detection comprising a system as described hereinabove and one at least among the following detectors:
a body scanner comprising detection means of a target object by means of one or more radiation energy modulated or emitted by the body of the inspected individuals,
a detector device comprising means adapted to detect stratification by vertical stacking, in the sole, by detection of successive echoes following emission of waves towards the sole,
measuring means of electrical capacitance formed by the sole of the shoe.

BRIEF DESCRIPTION OF DIAGRAMS

Other characteristics, aims and advantages of the present invention will emerge more clearly from the following detailed description and with respect to the appended drawings given by way of non-limiting examples and in which:

FIG. 1 previously described illustrates a detector device for inspection of a shoe according to the prior art.

Figure 3A:
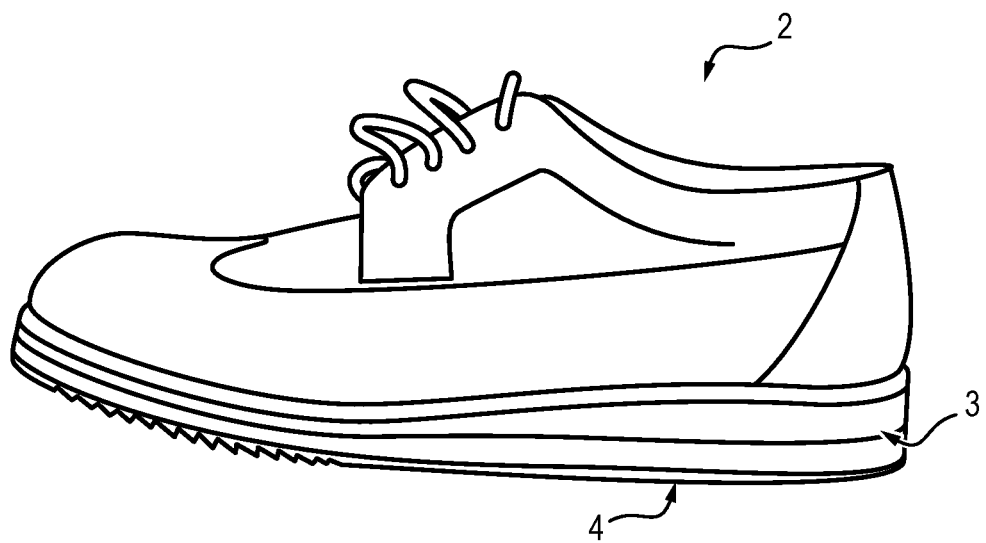
FIGS. 3a and 4a are photographs taken in profile of two examples of a shoe.
Figure 3B:
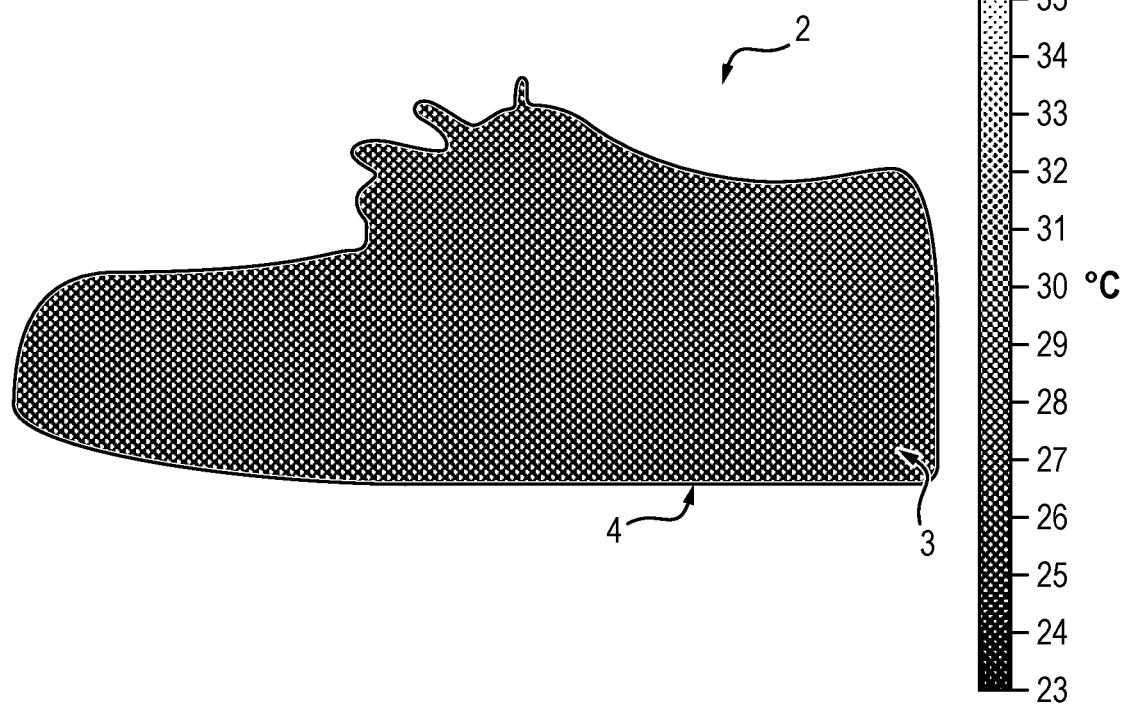
FIG. 3b is a thermal image of the shoe of FIG. 3a obtained by means of an infrared camera.
Figure 3C:
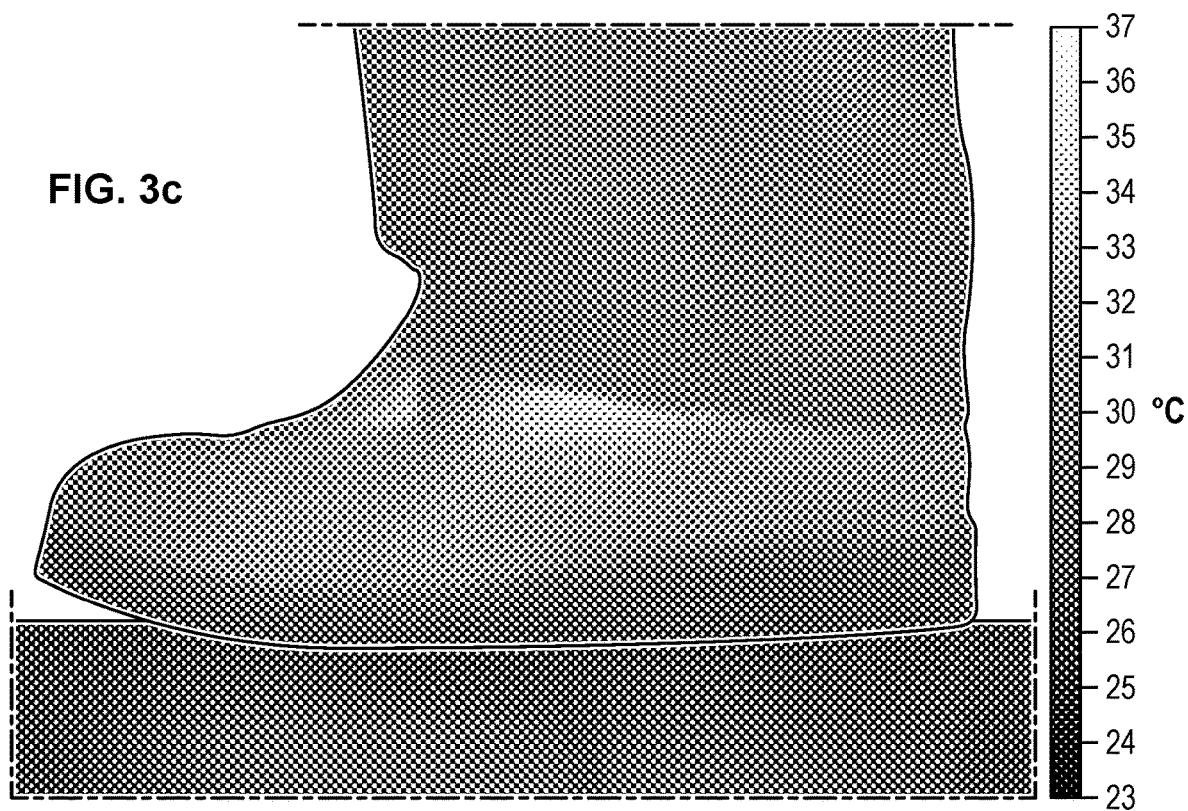

FIG. 3c corresponds to the thermal image of FIG. 3a after application of a low-pass filter.

Figure 3D:
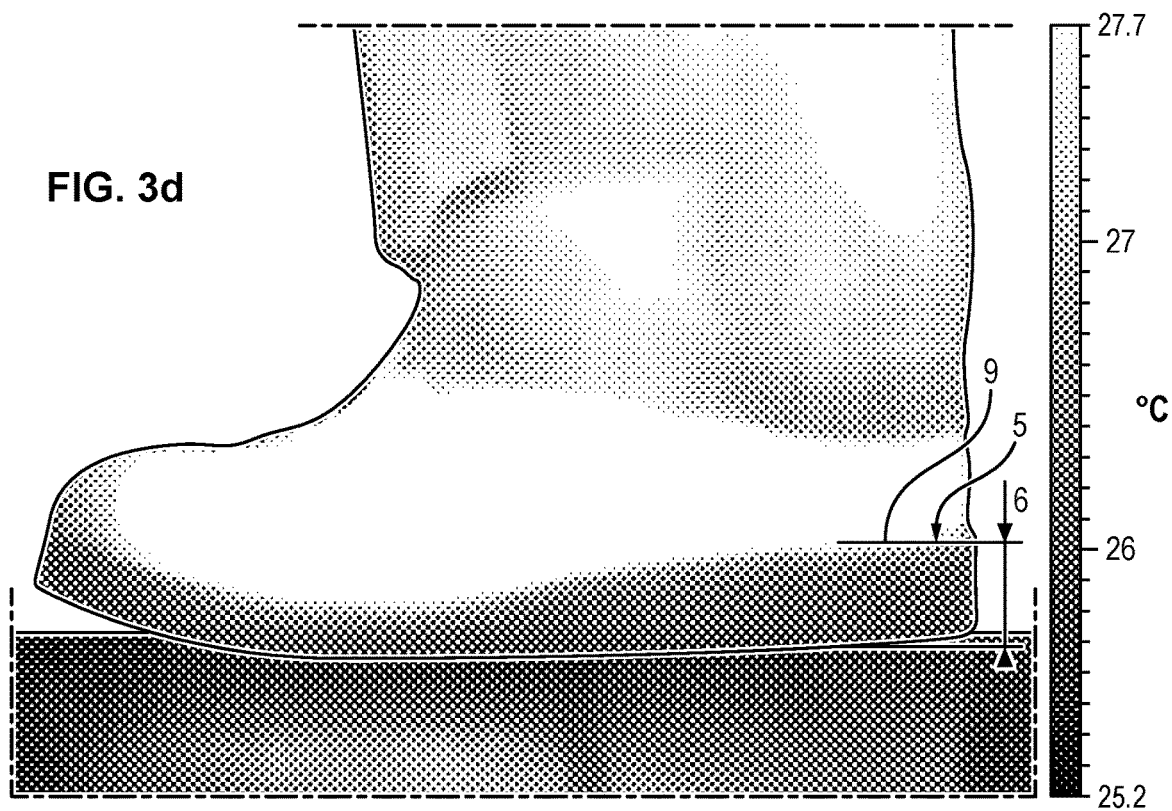
Figure 4A:
Figure 4B:
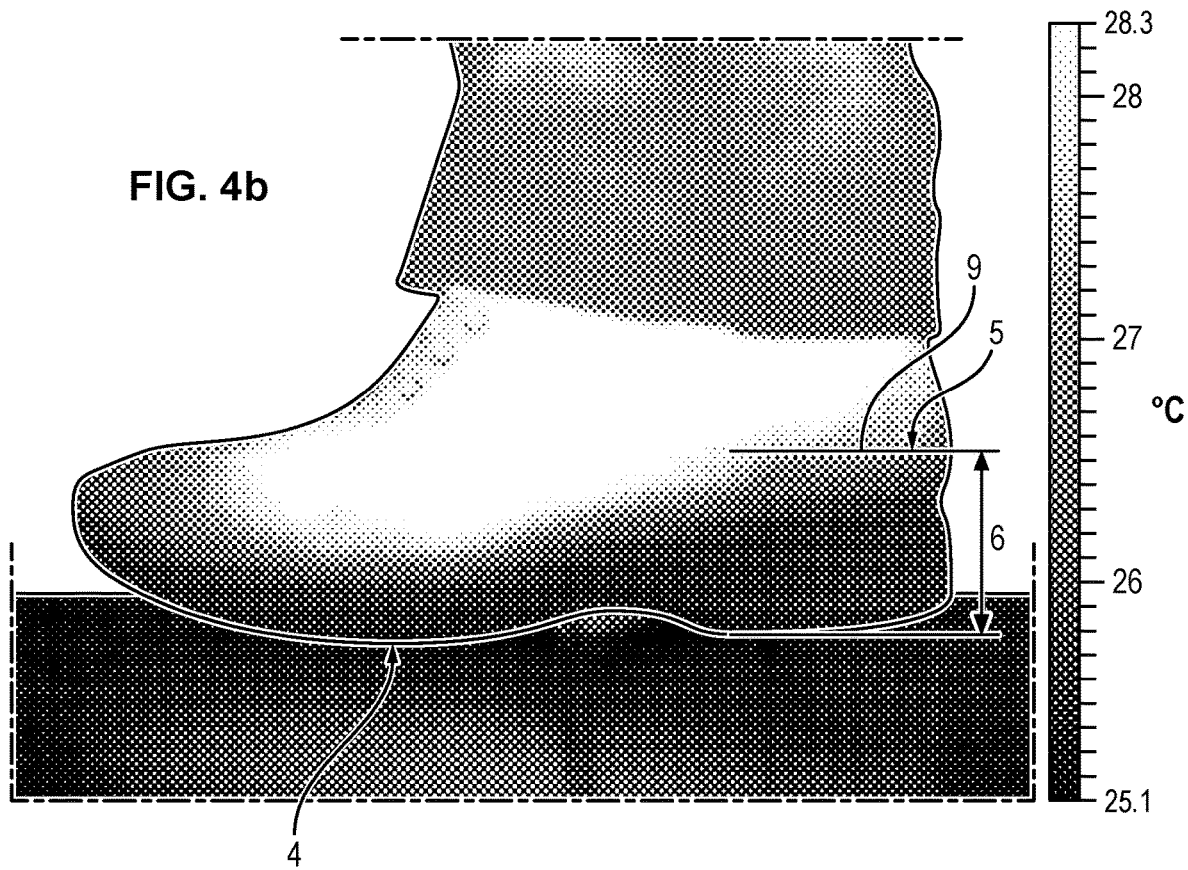

FIGS. 3d and 4b correspond to the thermal images of FIGS. 3a and 4a, respectively, after having applied a low-pass filter and modified the temperature scale.

Figure 4C:
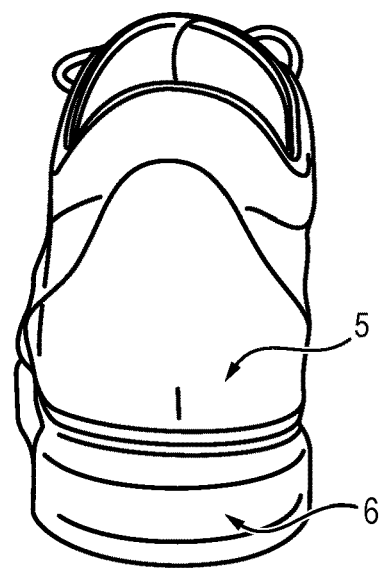

FIGS. 3e and 4c are rear views of the shoes of FIGS. 3a and 4a, respectively,

FIG. 3f is a thermal image of the shoe of FIG. 3e obtained by means of an infrared camera.

Figure 3G:
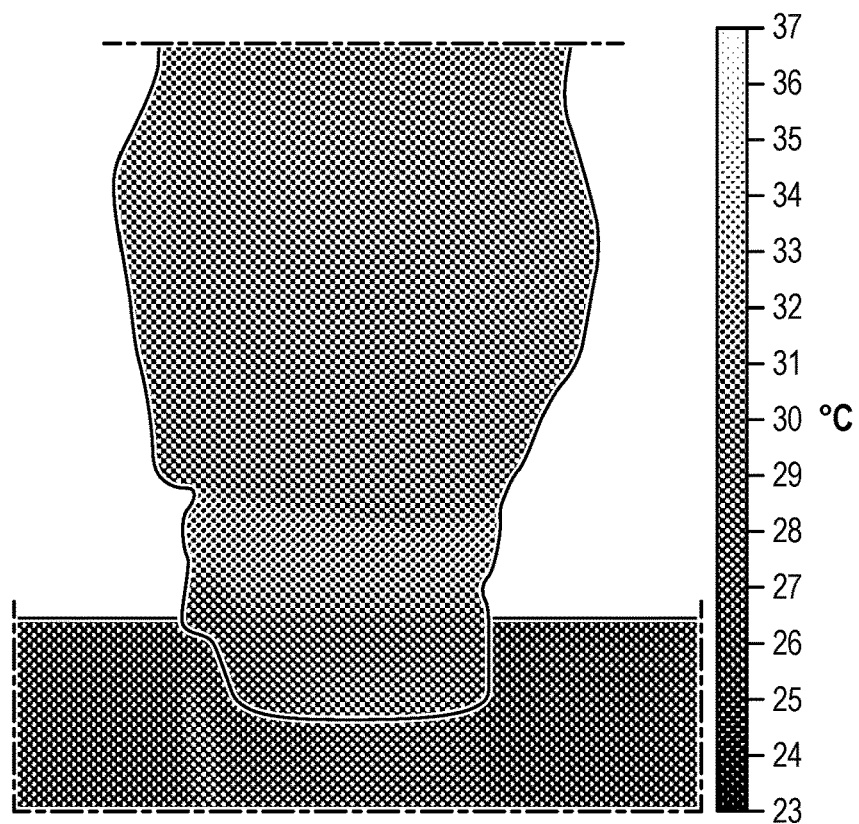

FIG. 3g corresponds to the thermal image of FIG. 3e after application of a low-pass filter.

Figure 3H:
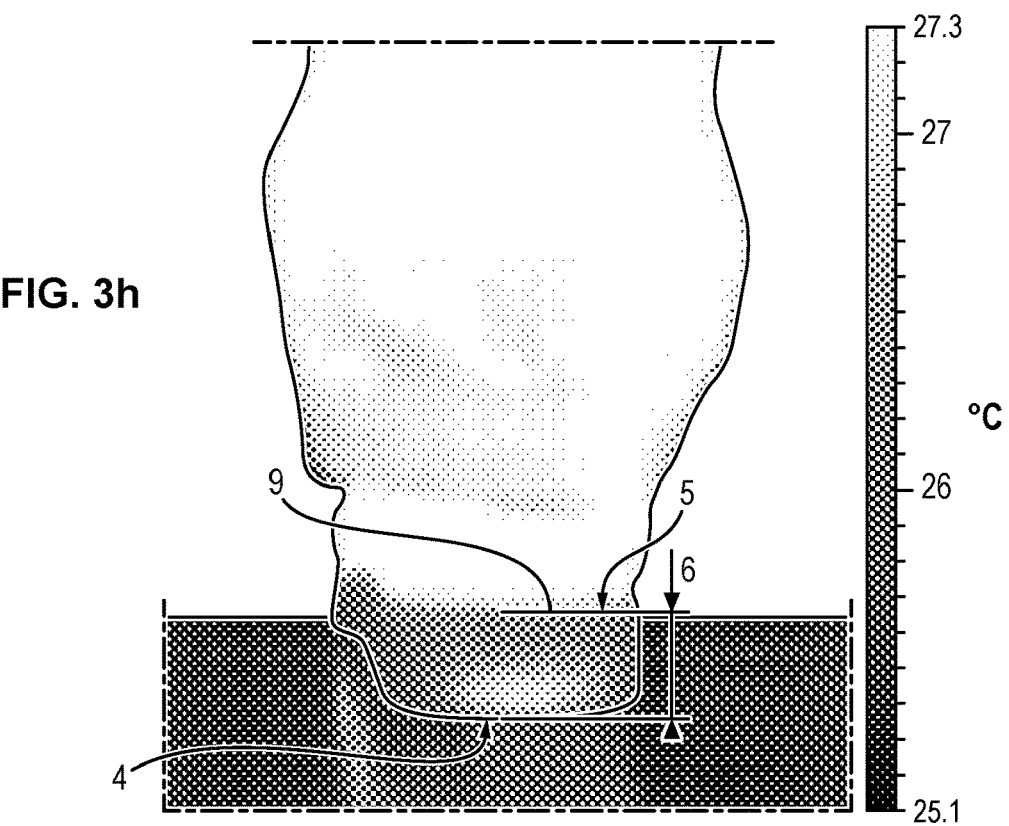
Figure 4D:
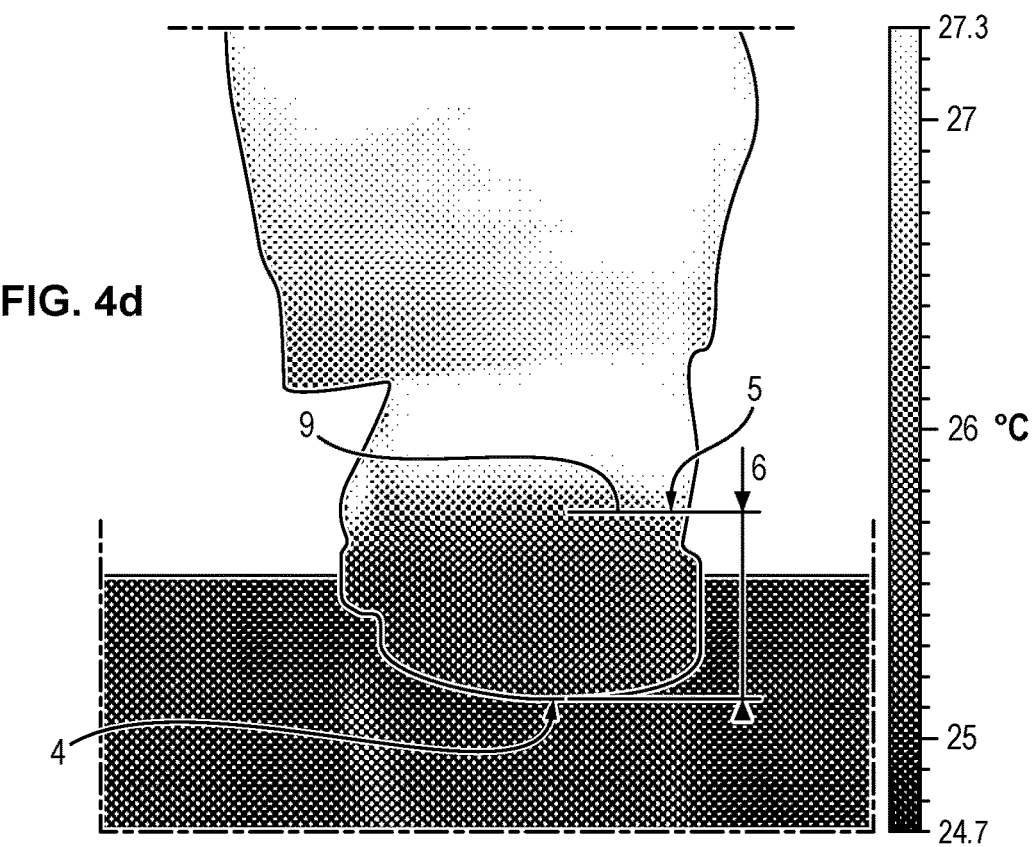

FIGS. 3h and 4d correspond to the thermal images of FIGS. 3e and 4c, respectively, after having applied a low-pass filter and modified the temperature scale.

Figure 5A:
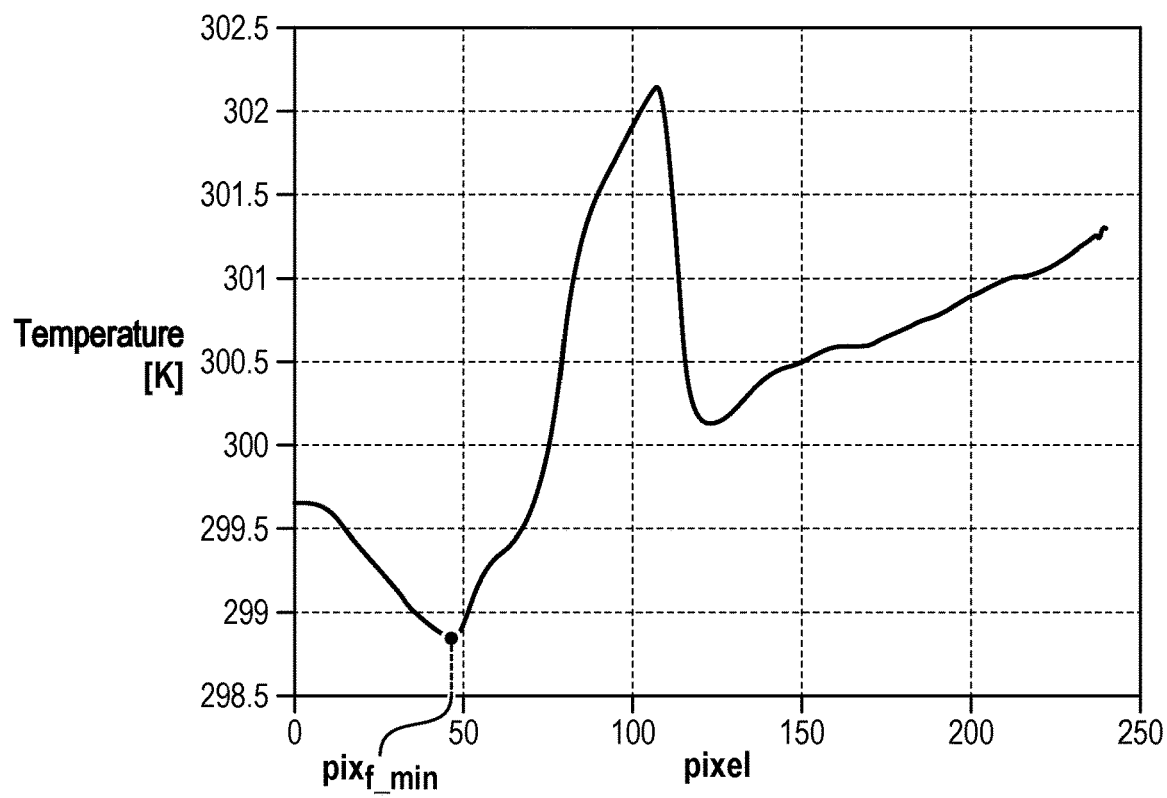

FIG. 5a illustrates an example of a graph representing the value (temperature, in Kelvin) of a column of averaged pixels and to which a low-pass filter has been applied.

Figure 5B:
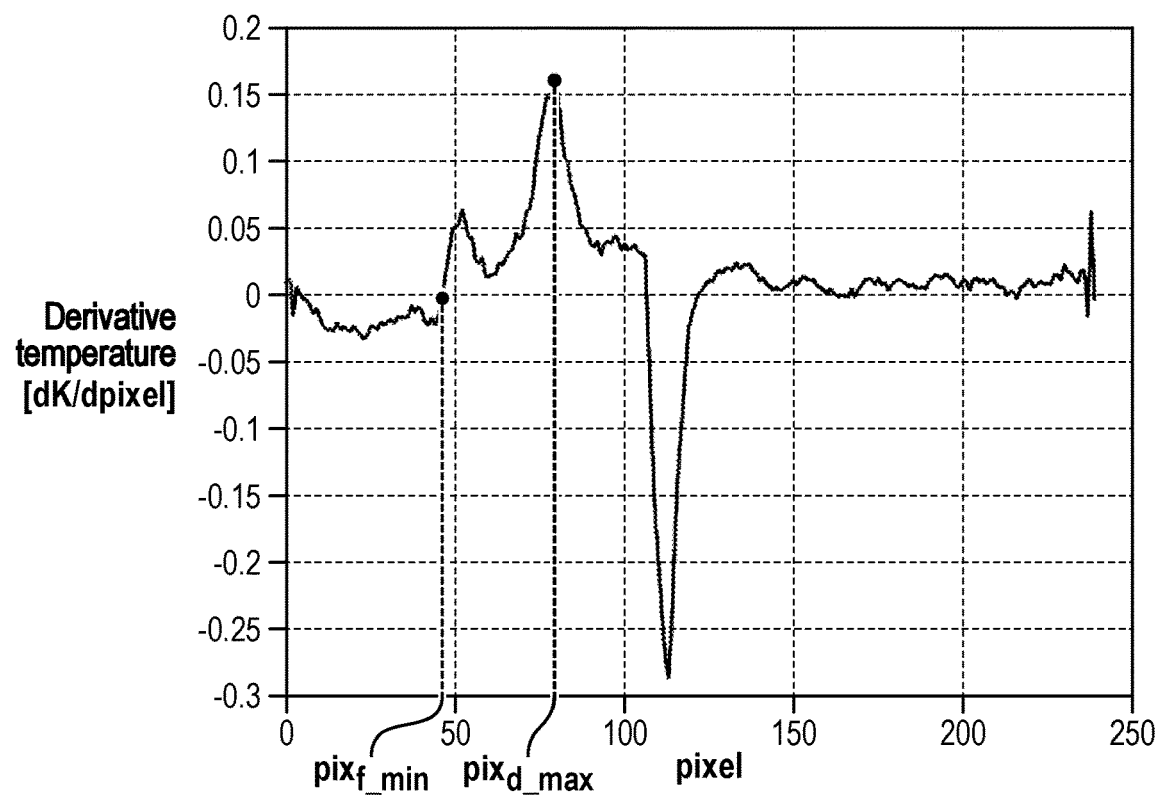

FIG. 5b is a graph representing the derivative of the values (derivative of the temperature as a function of pixels) of FIG. 5a.

Figure 6:
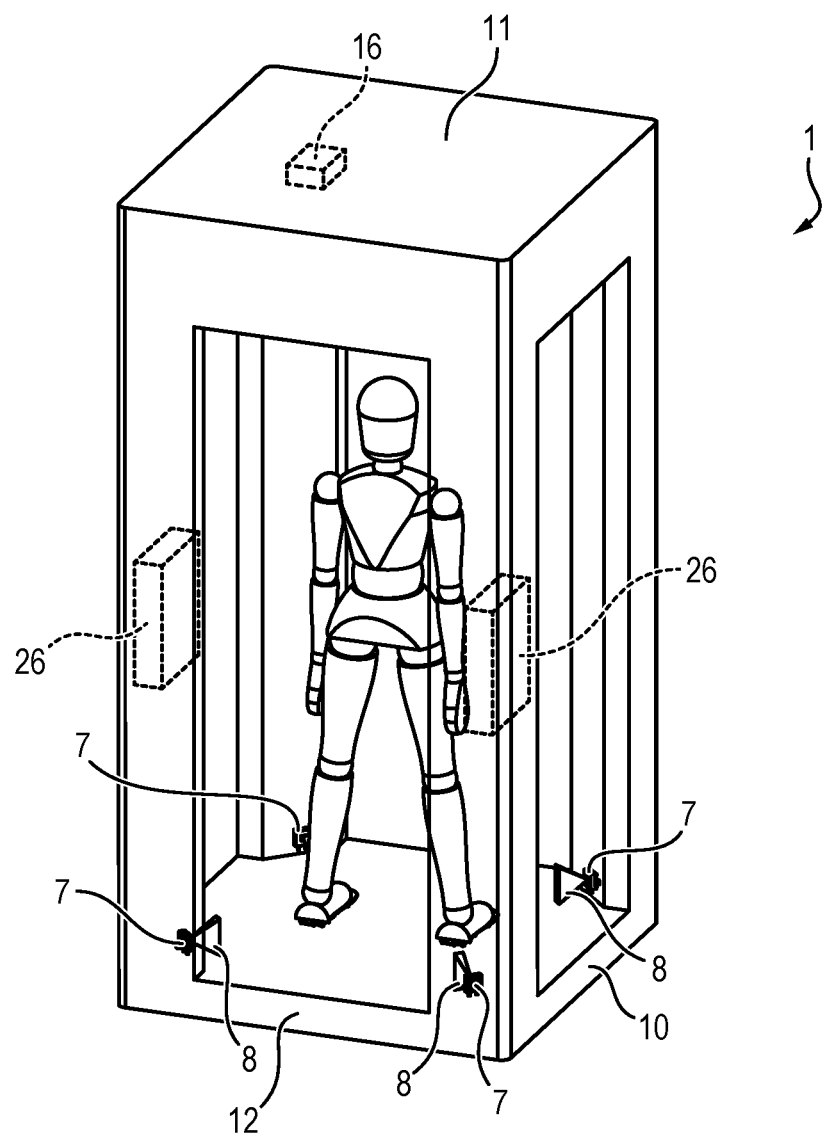

FIG. 6 illustrates a first example of an inspection system according to the invention in the form of a body scanner.

Figure 7:
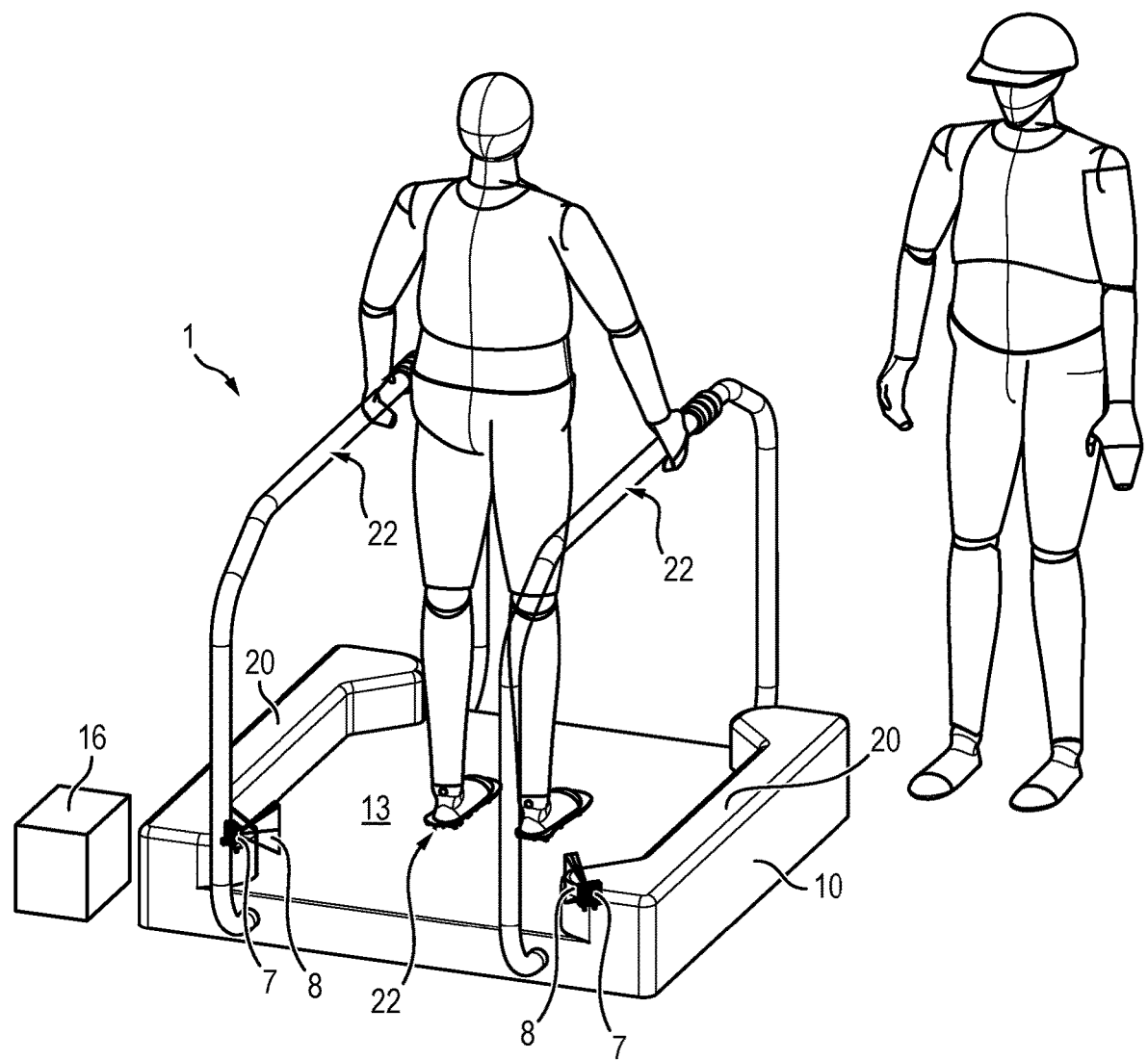

FIG. 7 illustrates a second example of an inspection system according to the invention in the form of an inspection device of shoes.

Figure 8:
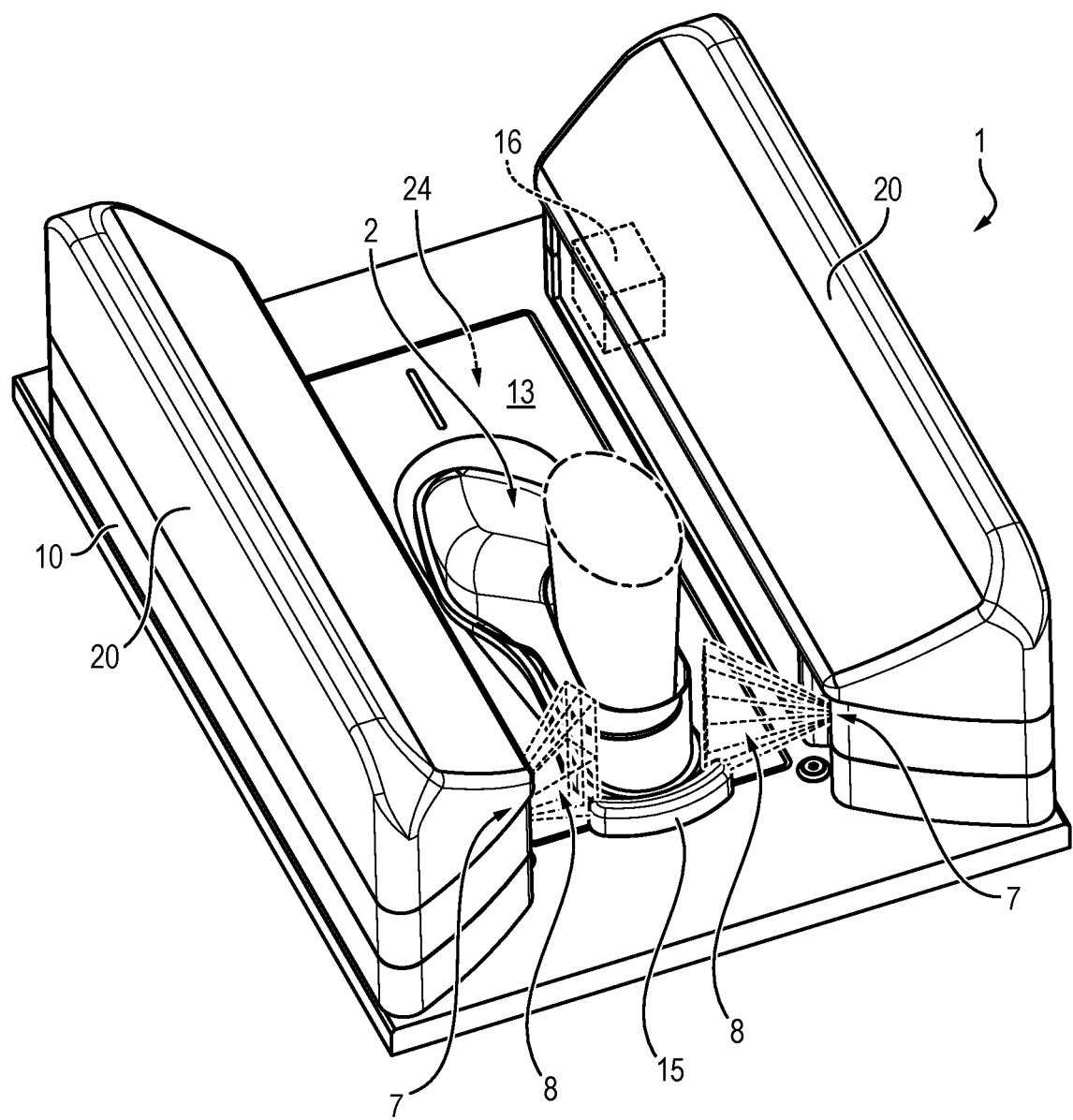

FIG. 8 illustrates a second example of an inspection system according to the invention in the form of an inspection device of a shoe.

Figure 9:
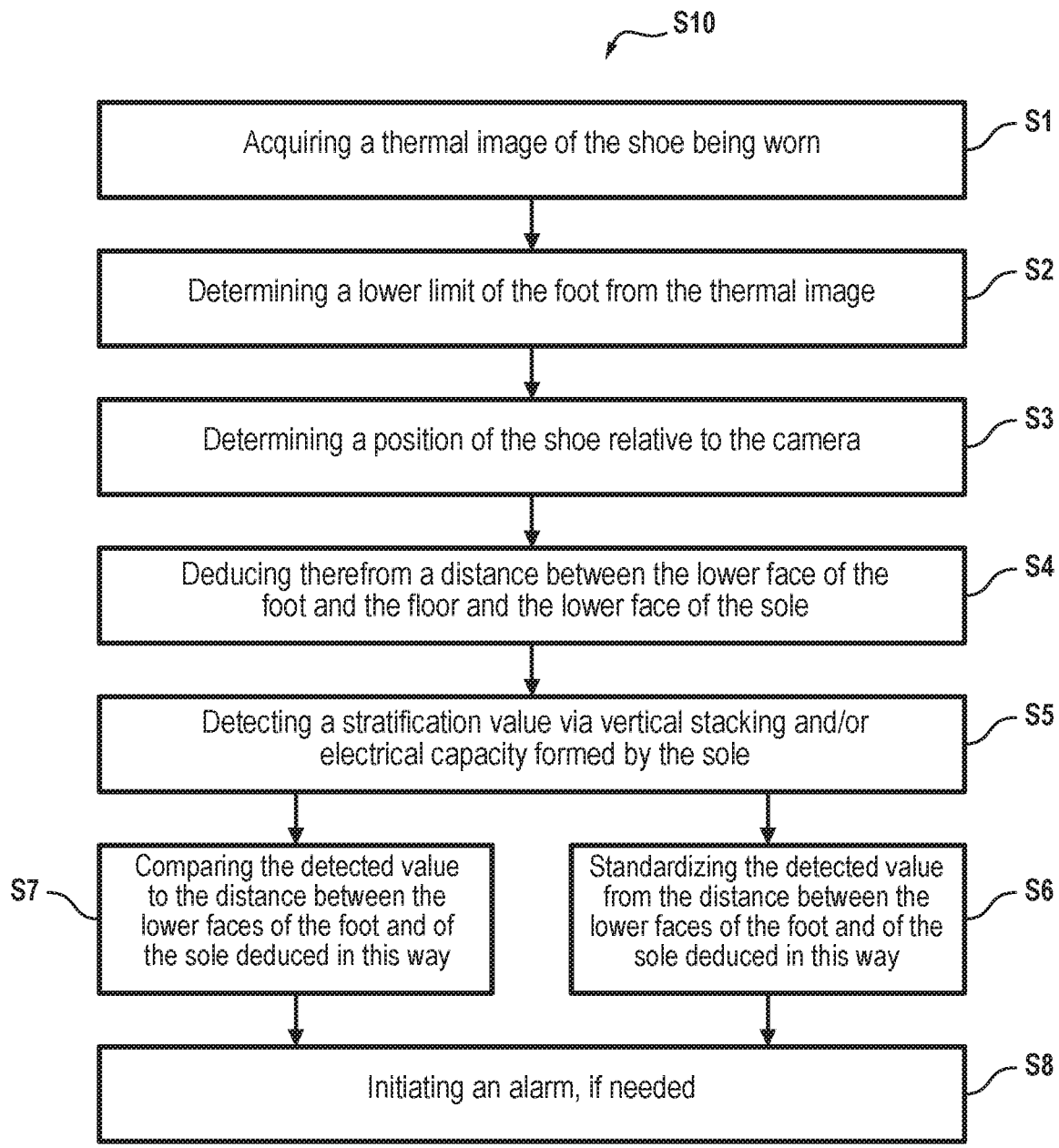

FIG. 9 is a flowchart illustrating the steps of an inspection method according to an embodiment of the invention.

Figure 10:
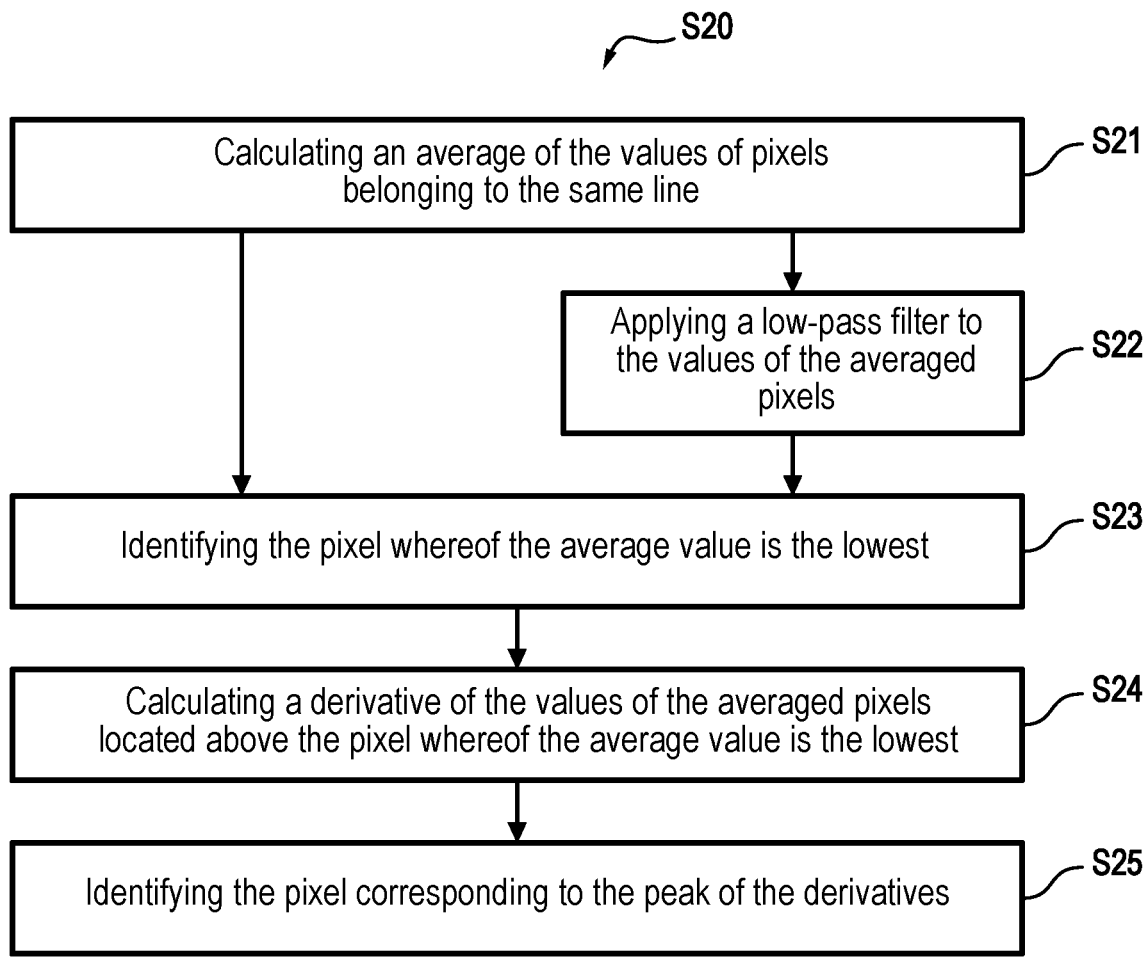

FIG. 10 is a flowchart illustrating examples of sub-steps for determining, from a thermal image, the lower limit of the foot of the individual.

Figure 11:
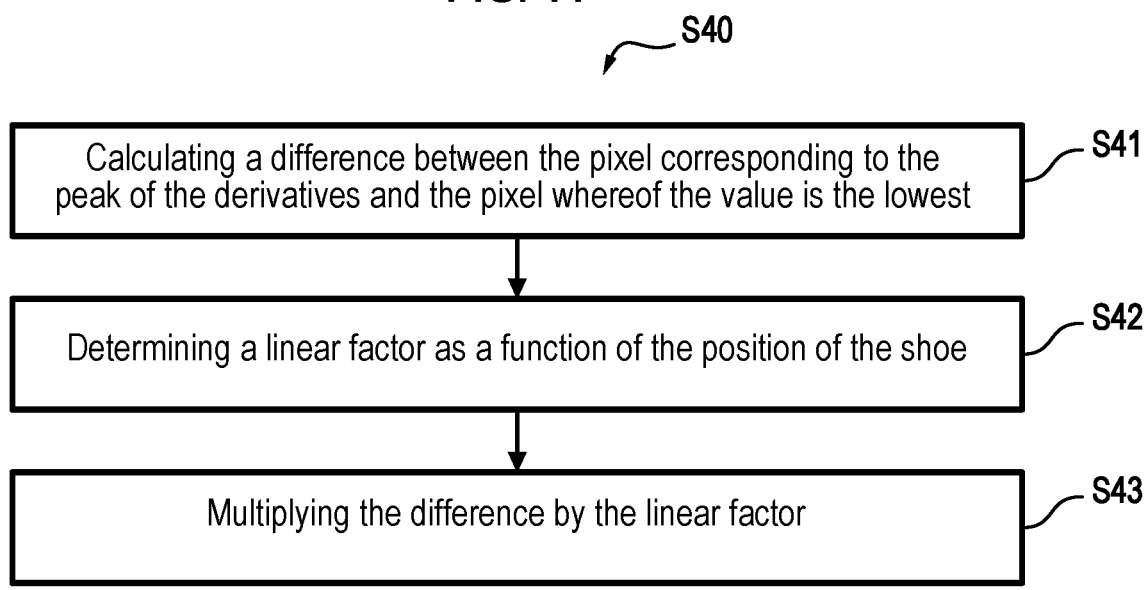

FIG. 11 is a flowchart illustrating examples of sub-steps for deducing from the lower limit of the foot and the distance between the shoe and the thermal camera a distance between the lower face of the sole and the lower face of the foot of the individual.

DETAILED DESCRIPTION OF AN EMBODIMENT

To detect target objects, the invention proposes using one or more thermal cameras 7 for determining a distance 6 (along an axis normal to the floor) between a floor and the lower face of the heel of the wearer and using this information for detecting the possible presence of a target object in the shoe 2. This distance 6 corresponds to the thickness of the sole 3, when the individual is not transporting a target object between the foot and the sole 3.

Thermal camera 7 (also known as infrared camera) here means a device configured to record infrared radiations emitted by a body and which vary as a function of their temperature.

Thermal cameras 7 have already been used for inspection of individuals. Yet to the extent where a thermal camera 7 does not obtain a precise image of the contours of the body of an individual when the latter is clothed, they are currently employed only in detecting when a line is crossed (infrared barriers) or for determining a distance between the device and an object. Reference could be made especially to documents FR 2 950 976 or US 2007/235652 which describe such examples of use.

Figure 1:
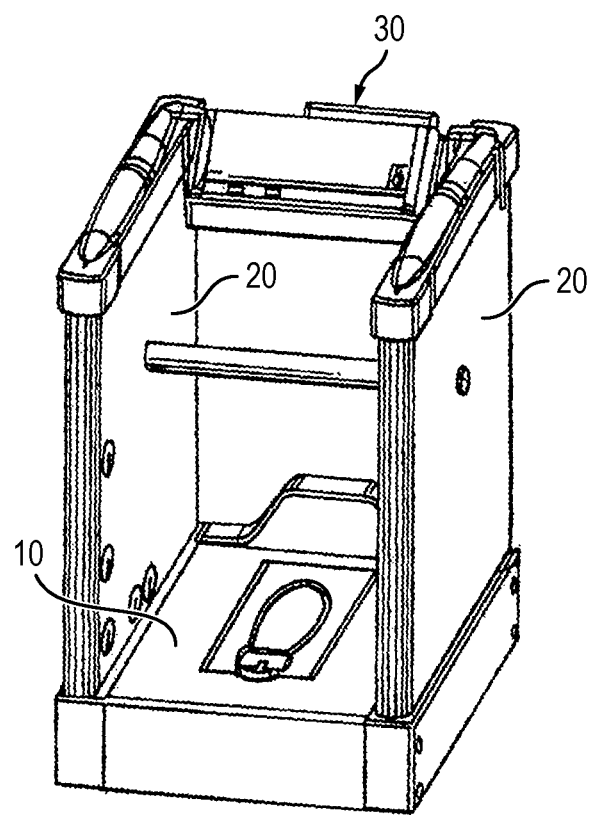
Figure 2:
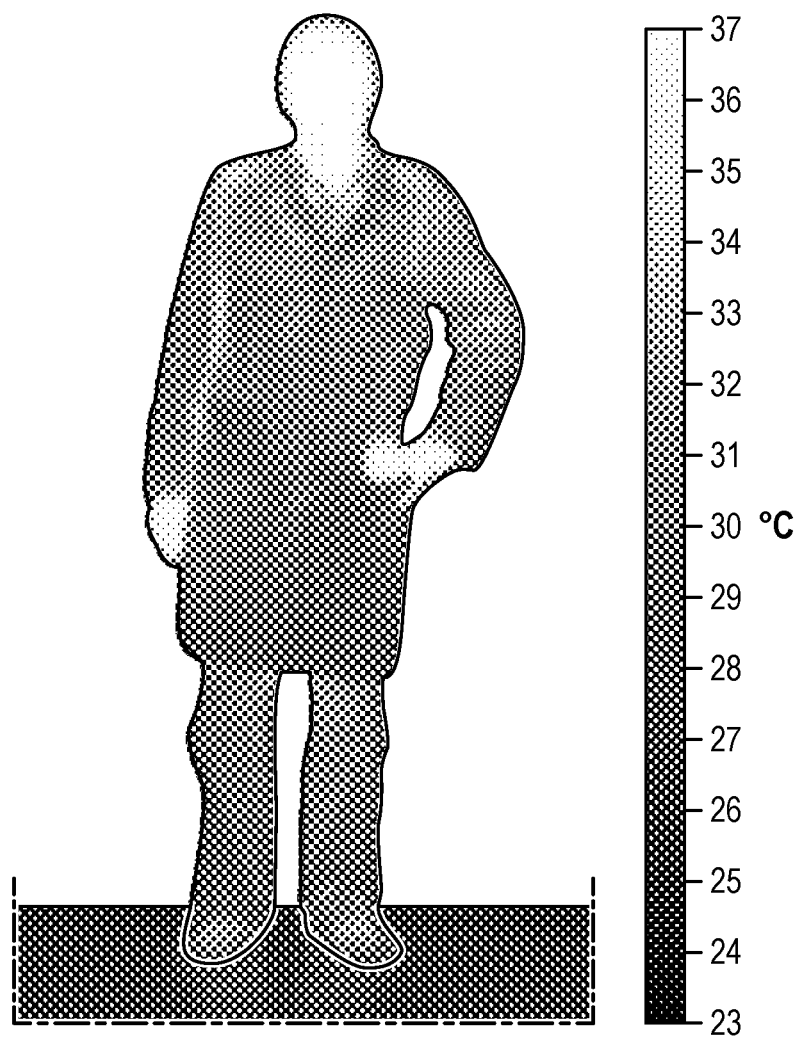
FIG. 2 is a thermal image of an individual taken front on, showing the individual upright.

In fact, as evident in the attached FIG. 2, a thermal camera 7 records the infrared radiation emitted by the body of the individual. Now, the clothing of the individual is necessarily heated by the latter when he wears it, preventing the precise contour of his body from being determined and therefore the presence optionally of target objects concealed under his clothing. Also, the upper of the shoes 2 blocks the dissipation of heat and therefore reduces the radiation emitted by the feet, such that the zone of the feet is even more difficult to distinguish on thermal images taken by the camera than the rest of the body. This also is apparent from FIGS. 3b and 3f which, as will be evident below, correspond to thermal images of a shoe 2 worn by an individual, prior to processing by the processor.

The applicant noticed that, against any attempt, it was still possible and advantageous to use a thermal image taken of the shoe 2 worn by the foot of the individual for precisely determining the distance 6 between the lower face of his foot and the floor. As shown in FIGS. 3b, 3h, 4b and 4d, after processing of images the limit between the lower face of the foot 5 and the floor is in fact sufficiently precise for deducing this distance 6 therefrom.

A system 1 for inspection of a shoe 2 according to the invention comprises the following elements:

a base 10 configured to receive at least one foot of an individual covered by the shoe 2, a thermal camera 7 configured to acquire a thermal image of the shoe 2 worn by the individual, means 15 configured to determine a position of the shoe 2 relative to the thermal camera 7 and a processor 16 configured to determine, from the thermal image of the shoe 2, a lower limit 9 of the foot of the individual, said lower limit 9 corresponding to a lower face of the foot 5, and deducing of the position of the shoe 2 relative to the thermal camera 7 and of the lower limit 9 of the foot a distance 6 between the lower face 4 of the sole 3 and the lower face of the foot 5 of the individual.

Sole 3 here means the part of the shoe 2 which is in contact with the floor. For this purpose it comprises a lower face 3 which is in direct contact with the floor, an upper face configured to come into contact with the lower face of the foot 5 of an individual (or, if needed, the target object, when said object is placed between the foot and the sole 3). According to the shoes 2, the lower limit 9 of the foot is visible from the exterior (case of the example illustrated in FIGS. 3a to 3h), or masked (case of compensated shoes 2 such as that illustrated in FIGS. 4a to 4d).

The general structure of the system 1 can be any type.

The structure of the system 1 could for example correspond to that of a body scanner, as described in documents EP 2 202 700, US 2014/0320331 or even US 2007/0235652 and illustrated by way of nonlimiting example in FIG. 6.

More precisely, the system 1 can comprise a base 10 comprising at least two symmetrical lateral panels 20 housing detection means 26, and especially radiation energy of X-ray type, microwaves, millimetric waves, infrared light, terahertz waves or even ultrasound. Other detection means can of course be possible, in addition or in alternative detection means of radiation energies, and especially windings for detecting metals, sampling means, for example in the form of suction nozzles, for drawing off steam or traces of particles, for example drugs or explosives, analysis means based on nuclear magnetic resonance comprising for example Helmholtz coils, or again complex impedance analysis means or radioactive radiation detectors.

Typically, the base 10 can form an airlock or more simply a door.

Optionally, the base 10 can also comprise a cross-beam 11 connecting the panels in the upper part, above the head of the individual, and/or a baseplate 12 on which the individual walks.

As a variant, the general structure of the system 1 can correspond to that usually used in inspection devices of a shoe 2 such as those described in documents FR 2 860 631, EP 1 574 879, FR 2 889 338 and FR 2 911 212 and illustrated by way of non-limiting example in FIGS. 7 and 8. The general structure of these devices will not be described in detail below. It is recalled however that these figures show a device comprising:

a base 10 support formed by a board 13 in the form of a step intended to receive and position a foot covered by a shoe 2, and two symmetrical lateral panels 20 which house detection means, and optionally, an information module.

The device shown in these figures can be compliant as to its geometry, its dimensions, the nature of messages displayed on the information module, the dispositions described in the abovementioned documents.

The same applies for any accessories of random sorting means type of individuals submitted to analysis, frequencies implemented for detecting metals and/or installation of a foot against the two panels to initiate processing.

In an embodiment, the device comprises one at least of the following detection means:

means 24 adapted to detect stratification by vertical stacking, in the sole 3, by detection of successive echoes following emission of waves towards the sole 3, and/or measuring means of electrical capacitance formed by the sole 3 of the shoe 2. For example, these measuring means can comprise electrodes 22 placed in the region of the print and electrodes 22 placed in the upper part of the lateral panels 20. They will be defined in more detail hereinbelow.

The means 15 configured to determine the position of the shoe 2 relative to the thermal camera 7 can especially comprise a mechanical stop that is fixed relative to the thermal camera 7 and configured to come into contact with a part of the shoe 2 during the inspection. Typically, the mechanical stop can be positioned so as to come into contact with the tip of the shoe 2 or his heel. As will be evident hereinbelow, the mechanical stop 15 is preferably positioned so as to receive a rear part of the heel, so that the position of the heel of the individual can be determined precisely. In this embodiment, the mechanical stop is preferably positioned and dimensioned so as not to hinder the capture of thermal images by the thermal camera 7.

The mechanical stop can especially be fixed to the baseplate 12 of the body scanner or on the board 13 of the inspection device.

In the embodiment illustrated in FIG. 8, the mechanical stop is a low wall fixed on the board 13 of the detector device. The low wall is curved to mould the form of the heel and fix the axial position (according to the direction of insertion of the foot in the device) and the orientation of the foot in the device.

As a variant, the means 15 configured to determine the position of the shoe 2 relative to the camera can comprise one at least of the following elements:

visual marking (such as a footprint), placed on the baseplate 12 of the body scanner or on the board 13 of the inspection device. The visual marking can be integrated or fixed non-detachably on the baseplate 12 (or the board 13) or projected by means of an image projector.

an array of antennas configured to send and/or receive a magnetic field. The antennas can be fixed in or under the baseplate 12 of the body scanner (or in or under the board 13 of the inspection device).

a set of photoelectric cells configured to send and/or receive an optic beam, said set being fixed on two walls opposite the system 1 configured to be positioned on either side of the shoe 2 so that an optic beam emitted by an emitting cell in the direction of a receiving cell opposite is interrupted by the presence of the foot of the individual.

at least one sender/infrared receiver couple and a device for analysing the round trip time of infrared waves between the sender and the receiver.

For example, the (photoelectrical or infrared) senders can be housed in one of the lateral panels 20 of the system 1 (whether lateral panels 20 of the body scanner or of the inspection device), while the receivers can be housed in the other lateral panel 20. As a variant, the senders and the receivers can be housed in the two lateral panels 20 at the same time.

It is understood of course that each of the examples of means 15 for determining the position of the foot can be used alone or in combination. Typically, the system 1 can comprise visual marking and a mechanical stop at the same time.

The thermal camera 7 is sensitive to waves having wavelengths of the order of tens of micrometers, preferably between eight micrometers and fourteen micrometers.

The thermal camera 7 can be a camera unit capable of taking fixed images (photographs) or animated images (film).

The thermal camera 7 can be fixed to the base 10 of the system 1.

In an embodiment, the thermal camera 7 is positioned on the base 10 so as to acquire a thermal image of the rear of the shoe 2 of the individual. Preferably, the thermal image comprises the heel of the shoe 2. In fact, the applicant noticed that this part of the shoe 2 transmitted infrared radiation of the foot more and more precisely and produced more exact results (see FIGS. 3e to 3h, 4b and 4d). The applicant explains this phenomenon by the fact that the shoe 2 is in contact over time with the heel of the individual, whereas the front part is less adjusted to leave room for his toes. Transmission of the infrared radiation is therefore performed better in the region of the heel, producing a clearer image of the heel than of the front part of the foot with the thermal camera 7 and therefore more precisely determining the limit 9 between the lower face of the foot 5 and the sole 3 of the shoe 2.

When the base 10 is placed on a floor, an angular field 8 of the thermal camera 7 in a plane perpendicular to the floor is larger than an angular field 8 of the thermal camera 7 according to a horizontal plane parallel to the floor. In other terms, the thermal image is higher than wide. This configuration is particularly adapted when the thermal camera 7 acquires a thermal image of the heel of the shoe 2 since this zone of the body is narrow and the aim is to identify the limit 9, along an axis normal to the floor, between the foot and the shoe 2. Reference could be made especially to FIGS. 6 to 8 which illustrate the angular fields 8 of the cameras.

In an embodiment, the thermal image is a bidimensional matrix comprising N lines of pixels and M columns of pixels, where N is strictly greater than M. For example, N can be equal to 320 while M can be equal to 240.

If needed, the system 1 can comprise two thermal cameras 7 fixed on the base 10, each thermal camera 7 being configured to acquire an image of one of the shoes 2 of the individual. The two shoes 2 of the individual can therefore be inspected simultaneously (see FIGS. 6 to 8).

Optionally, the system 1 can also comprise at least one additional thermal camera 7 configured to acquire an additional thermal image of the shoe 2. For example, one of the cameras can acquire a thermal image of the heel while the other of the cameras acquires a thermal image of the front of the shoe 2.

The system 1 can of course comprise four thermal cameras 7, specifically two thermal cameras 7 for each shoe 2, as illustrated in the embodiment of FIG. 6.

The processor 16 can be housed in the base 10 of the system 1 or at a distance from the latter, in the same room or in another location, wired or wireless, and be connected to the thermal camera 7 and if needed to the means 15 for determining the position of the shoe 2 relative to the thermal camera 7.

The processor 16 can also comprise a memory for recording, at least temporarily, the thermal images taken by the thermal camera 7 as well as any preferred maps of reference materials (especially when the detector comprises measuring means of electrical capacitance formed by the sole 3 of the shoe 2).

Steps which can be performed for the inspection S of at least one shoe 2 worn by an individual will now be described. In the following, to simplify the description, the means 15 for determining the position of the shoe 2 comprise visual marking in the form of a footprint formed on the associated base 10 of a mechanical stop, if needed. At the time of acquisition of the thermal image, the position of the shoe 2 relative to the thermal camera 7 is therefore fixed and known.

Also, the thermal camera 7 is placed so as to acquire a thermal image comprising the heel of the shoe 2.

FIG. 9 is a flowchart S10 illustrating the steps of an inspection method according to an embodiment of the invention. First, the individual is positioned in the system 1.

When the system 1 comprises a body scanner, the individual stands between the two lateral panels 20, if needed upright on the baseplate 12, by positioning his feet on the prints. In the embodiment of FIG. 6, the means 15 of determining the position of the feet of the individual in fact comprise no mechanical stop, even though this is possible.

When the system 1 comprises a detector device (FIGS. 7 and 8), the individual positions his foot or feet on the board 13, on the print and if needed against the associated mechanical stop.

During a step S1, the thermal camera 7 acquires a thermal image of the shoe 2, worn by the individual.

The thermal image is a bidimensional matrix comprising N lines of pixels and M columns of pixels, in which each pixel corresponds a value of a radiation intensity.

During a step S2, the lower limit 9 of the foot of the individual is determined. This lower limit 9 corresponds to the position of the lower face of the foot 5 in the shoe 2, which can be the upper face of the sole 3 when the individual is not transporting a target object in his shoe 2 or the upper face of the target object when the individual is concealing such a target object above the sole 3.

FIG. 10 is a flowchart S20 illustrating examples of substeps for determining, from a thermal image, the lower limit of the foot of the individual. For this, during a sub-step S21 and for the N lines of pixels, the processor 16 calculates an average of the values of the pixels belonging to the same line to obtain a column of N averaged pixels (hereinbelow pix(i), with i∈[1; N]). If needed, the processor 16 can, prior to this step S21, select a zone of the thermal image comprising the heel of the individual.

Optionally, as illustrated in FIG. 5a the processor 16 can apply a low-pass filter to N averaged pixels (step S22). For example, the processor 16 can, for an averaged pixel pix(i), take the average of the values of this pixel with the values of the three pixels located immediately above and the three pixels located immediately under in the column of averaged pixels to obtain averaged and filtered pixels $pix_f(i)$:

$$pix_f(i) = \frac{1}{7} \sum_{k=i-3}^{k=i+3} pix(k)$$

During a sub-step S23, the processor 16 identifies the averaged pixel $pix_{min}$ (or if needed the averaged pixel $pix_{f\_min}$ after application of the low-pass filter) whereof the value is the lowest. This pixel $pix_{min}$ corresponds to the zone on the thermal image associated with the lower face 4 of the sole 3. In fact, on a thermal image, as shown especially in FIGS. 2, 3d, 3h, 4b and 4d, the floor reflects the infrared radiation. Also, the lower face 4 of the sole 3 is the part of the shoe 2 which is the farthest from the foot and the rest of the body of the individual: so it is the part which emits the lowest infrared radiation. Consequently, on the thermal image all the zones situated under the lower face 4 of the sole 3 correspond to infrared radiation reflected by the floor. As will be evident below, the part of the thermal image which extends under the pixel $pix_{min}$ whereof the value is the lowest can therefore be taken away since it does not represent radiation emitted by the foot of the individual.

During a sub-step S24, the processor 16 calculates a derivative of the values of the averaged pixels pix(i) (or if needed, values of the pixels $pix_f(i)$ after application of the low-pass filter) to obtain derivatives $pix_d(i)$.

$$pix_d(i) = \frac{pix(i+1) - pix(i)}{x}$$

where x is the height of a pixel pix(i). FIG. 5b illustrates for example the third sub-step S23 applied to the curve of FIG. 5a.

As a variant, as the height of the pixels of a thermal camera 7 is constant, a difference between the value of the adjacent pixels can also be calculated.

The derivative is preferably calculated only for the averaged pixels (pix(i)) which are located above the pixel $pix_{min}$ whereof the value of the infrared radiation is the lowest.

During a sub-step S25, the processor 16 identifies the pixel $pix_{d\_max}$ corresponding to the peak of the derivatives $pix_d$ calculated in this way. This pixel $pix_{d\_max}$ corresponds to the lower limit 9 of the foot of the individual, that is, to the lower face of his foot.

In a step S3, the position of the shoe is relative to the thermal camera 7 and is determined at the time of acquisition of the thermal image. The position of the shoe can be either pre-determined by pre-recording the distance between the shoe 2 and the thermal camera 7 or measured instantaneously by dedicated means.

From the lower limit 9 of the foot of the individual and of the distance between the shoe 2 and the thermal camera 7, the processor 16 determines the distance 6 between the lower face of the foot 5 and the lower face 4 of the sole 3 (step S4).

FIG. 11 is a flowchart S40 illustrating examples of sub-steps for deducing from the lower limit of the foot and the distance between the shoe and the thermal camera a distance between the lower face of the sole and the lower face of the foot of the individual. For this, during a first sub-step S41 the processor 16 determines a difference Δ in multiples of pixels between the pixel $pix_{d\_max}$ corresponding to the peak of the derivatives and the averaged pixel $pix_{min}$ whereof the value is the lowest.

For example, as illustrated in FIG. 5b, when the pixel $pix_{d\_max}$ corresponds to the $79^{th}$ pixel starting out from the bottom of the column of averaged pixels (pix(79)) and the averaged pixel $pix_{min}$ whereof the value is the lowest corresponds to the $46^{th}$ averaged pixel (pix(46)), the difference Δ in multiple of pixels is equal to 79−46=33.

During a second sub-step S43, the processor 16 multiplies the difference Δ obtained in this way by a predetermined linear factor K, which depends on the position of the shoe 2 relative to the thermal camera 7. This is about a simple trigonometric calculation for converting into metric distance the number of pixels between the pixel $pix_{min}$ whereof the value is the lowest and the pixel $pix_{d\_max}$ corresponding to the peak of the derivatives. In this embodiment, this linear factor K is predetermined and pre-recorded, since the distance between the heel of the shoe 2 and the thermal camera 7 is fixed and known due to the print and if needed to the mechanical stop (step S42). The factor K is therefore equal to the tangent of the angle β between the lowest point of a given pixel and the highest point of said pixel (otherwise expressed, the tangent of the angle under which the thermal camera 7 sees a given pixel) multiplied by the distance between the face of the mechanical stop which makes contact with the shoe 2 and the thermal camera 7:

$$K = D \cdot \tan(\beta)$$

Therefore, in the example described hereinabove, for a linear factor K equal to 1.25, this gives a distance 6 equal to 41 mm.

As a variant, when the distance between the shoe 2 and the thermal camera 7 is not pre-recorded and is for example measured instantaneously by dedicated means (step S3), the processor 16 determines the angle β as a function of the distance measured by the means 15 for determining the position of the shoe 2 then calculates the linear factor K (step S42).

The processor 16 obtains the distance 6 (along an axis normal to the floor, or if needed the baseplate 12 or the board 13, according to the application) between the lower face of the foot 5 of the individual and the lower face 4 of the sole 3 of the shoe 2.

The distance 6 between the lower face of the foot 5 and the lower face 4 of the sole 3 determined in this way can be used to standardize information obtained by the system 1 or for completing/confirming the measurement of this distance 6 which was made in parallel by other means.

For example, in the case of the body scanner described in the document US 2014/0320331, the waves are reflected by the lower face of the foot 5 or as a variant by a target object placed in the shoe 2. If the target object is applied by way of uniform thickness under the foot of the wearer, the antennas cannot detect it. However, by combining information received by the antennas and the distance 6 determined from the thermal images of the shoe 2, the processor 16 can determine that the lower face of the foot 5 is at a greater distance than expected from the lower face 4 of the sole 3 or from the detected dielectrical material and generate an alarm so that security personnel examine the shoe 2.

The same applies in the case of the inspection device.

In particular, determining the distance 6 can be used to standardize signals for detecting the presence of a particular material within the shoe 2 and/or for purposes of redundancy to improve the reliability of the device.

For example, the system 1 of the invention can be used in an inspection device for detection of target objects comprising means adapted to detect stratification by vertical stacking S5 (that is, in a direction normal to the board 13), in the sole 3, by detection of successive echoes following emission of waves towards the sole 3, to standardize signals originating from detection means of the vertical stratification.

The detection means of the vertical stratification can especially comprise one or more couples of adjacent microwave senders and receivers 24, placed in the board 13, under the print. The receiving means integrated in this way detect the microwave echoes on the different interfaces or stratifications resulting from vertical stacking of successive layers having different propagation properties with respect to microwaves, between the lower surface 4 of the sole 3 and the lower surface of the foot 5. In other terms, the detection means of the vertical stratification detect the presence of a pocket or particular material within the mass of the sole 3, and therefore identify target objects concealed in the shoe 2.

Reference could be made especially to document FR 16 55726 registered on Apr. 15 2016 in the name of the applicant for more details on the structure and the operation of this type of detector.

In practice, microwaves sender/receiver assemblies detect the echoes sent back by the material interfaces resulting from vertical stacking within the sole 3 and detect the height of these interfaces by measuring the transmission and reception time of these echoes.

The main echo (that is, of higher amplitude) is that produced by the lower face of the foot 5 which corresponds to the upper face of the sole 3 (or if needed, the upper face of the target object).

The time and attenuation of this main echo can be standardized (step S6) by dividing it by the distance 6 between the lower face of the foot 5 and the lower face 4 of the sole 3 obtained during the deduction step S4, to obtain a delay/mm and attenuation/mm, independent of the thickness of the sole 3. The processor 16 can compare the delay and the standardized attenuation to predetermined thresholds and trigger an alarm in case it is exceeded (step S8), if needed.

In this way, standardization of echo receipt time on the receivers as a function of the distance 6 between the lower face of the foot 5 and the lower face 4 of the sole 3 makes for easier detection of an anomaly on a sole 3.

As a variant or in addition, the determined distance 6 from the thermal image of the shoe 2 can also be compared to the determined distance by way of the capacitive means (step S7) and triggering optionally of alerts in case of disagreement between the results (step S8).

In fact, for a sole 3 of minimal thickness, the system 1 waits for receipt of a main echo on the lower surface of the foot 5 after a short transmission and reflection time.

Inversely, for a sole 3 of considerable thickness, the system 1 waits for receipt of a main echo on the lower surface of the foot 5 after a longer transmission and reflection time.

However, if the system 1 detects a main echo after a short transmission and reflection time while the thermal image indicates a sole 3 of considerable thickness, the presence of a pocket or of a foreign body within the sole 3 can be suspected.

As a variant or in addition, in an embodiment the system 1 of the invention can also comprise measuring means of the electrical capacitance formed by the sole 3 of the shoe 2 placed on the base 10 (step S5). If appropriate, these measuring means of the electrical capacitance can be accumulated with the determining of the limit 9 of the lower face of the foot 5 to obtain robust and stable data on the effective distance 6 between the lower face of the foot 5 and the lower face 4 of the sole 3.

The measuring means of the capacity can comprise electrodes 22 placed in the region of the print and electrodes 22 placed in the upper part of the lateral panels 20, for example in the region of handles (see FIG. 7). The handles are preferably attached to the base 10 and can be made from electrically conductive material embedded in the mass of the lateral panels 20.

The device also comprises an electrical generator, typically a generator of alternating current, connected to the above electrodes 22 by means of an interrupter in series.

The capacity defined between the electrodes 22 under the print and in the handles depends essentially on the distance 6 between the lower face of the foot 5 and the lower face 4 of the sole 3 of the shoe 2. The value of the impedance of this capacity represented by the sole 3 is also high relative to that of the human body placed in between the same electrodes 22, such that the measuring means of the capacity obtain a measurement of the distance 6 between the lower face of the foot 5 and the lower face 4 of the sole 3. The capacity determined in this way can be standardized (step S6) by dividing it by the distance 6 between the lower face of the foot 5 and the lower face 4 of the sole 3 obtained during the deduction step S4, to obtain a capacity/mm independent of the thickness of the sole 3. The processor 16 can compare the standardized capacity to a predetermined threshold and if needed trigger an alarm in case it is exceeded (step S8).

As a variant or in addition, the determined distance 6 from the thermal image of the shoe 2 can also be compared to the determined distance by way of the capacitive means (step S7) and triggering optionally of alerts in case of disagreement between the results (step S78).

Here too, reference could be made to document FR 16 55726 for more details on using measuring means of capacity to determine the thickness of the sole 3.

The invention claimed is:

1. An inspection method comprising:
    acquiring, at a first time, a thermal image of a shoe by means of a thermal camera when the shoe is worn by a foot;
    determining, from the thermal image of the shoe, of a lower limit of the foot, said lower limit corresponding to a lower face of the foot;
    determining a position of the shoe relative to the thermal camera at the first time; and
    deducing from the position of the shoe relative to the thermal camera and from the lower limit of the foot a distance between a lower face of the sole and the lower face of the foot.

2. The method according to claim 1 wherein, during the acquiring, the thermal camera is oriented in a direction of a heel of the foot such that the thermal image comprises said heel.

3. The method according to claim 1, wherein the thermal image is a bidimensional matrix comprising N lines of pixels and M columns of pixels, in which a value of a radiation intensity corresponds to each pixel.

4. The method according to claim 3, wherein determining the lower limit comprises:
    calculating, for the N lines of pixels, an average of the values corresponding to radiation intensity of the pixels belonging to a same line of the N lines of pixels to obtain a column of N averaged pixels;
    calculating a derivative of each averaged pixel with respect to the radiation intensity of the pixels to obtain N derivatives; and
    identifying a pixel of the bidimensional matrix that corresponds to a peak of the N derivatives.

5. The method according to claim 4, wherein the deducing comprises identifying an averaged pixel having the lowest value of radiation intensity.

6. The method according to claim 5, wherein the deducing comprises:
    calculating a difference in multiples of pixel between the pixel of the bidimensional matrix that corresponds to the peak of the N derivatives and the averaged pixel having the lowest value of radiation intensity;
    determining a linear factor as a function of the position of the shoe relative to the thermal camera; and
    multiplying the difference by the linear factor to deduce the distance.

7. The method according to claim 5, wherein the identifying the peak of the N derivatives comprises identifying the peak among derivatives corresponding to averaged pixels extending between the averaged pixel having the lowest value of radiation intensity and averaged pixels extending above the averaged pixel having the lowest value of radiation intensity.

8. The method according to claim 4, further comprising applying a low-pass filter to the averaged pixels prior to the calculation the N derivatives.

9. The method according to claim 1, further comprising:
    detecting stratification by vertical stacking in the sole, by detecting successive echoes following emission of waves towards the sole;
    normalizing the stratification from a distance between the lower face of the foot and the lower face of the sole to obtain a normalized stratification; and
    comparing the value of the normalized stratification with a first predetermined threshold, and triggering an alarm when the normalized stratification exceeds the first predetermined threshold.

10. The method according to claim 1, further comprising:
    detecting stratification by vertical stacking in the sole, by detecting successive echoes following emission of waves towards the sole;
    identifying an echo of higher amplitude among the successive echoes;
    determining a transmission time and a reflection time of the echo of higher amplitude;
    deducing from the transmission time and the reflection time a height between a stratification corresponding to the echo of higher amplitude and the lower face of the sole; and comparing the height with the distance between the lower face of the foot and the lower face of the sole and, if needed, triggering an alarm in response to the compared height.

11. The method according to claim 1, further comprising:
measuring electrical capacitance formed by the sole of the shoe placed on a base;
normalizing the electrical capacitance from the distance between the lower face of the foot and the lower face of the sole; and
comparing the normalized electrical capacitance with a second predetermined threshold and triggering an alarm when the normalized stratification exceeds the second predetermined threshold.

12. The method according to claim 1, further comprising:
measuring electrical capacitance formed by the sole of the shoe placed on a base;
deducing from the electrical capacitance a height between the lower face of the foot and the lower face of the sole; and
comparing the height with the distance between the lower face of the foot and the lower face of the sole and, if needed, triggering an alarm in response to the compared height.

13. The method of claim 1, wherein the deduced distance measures a physical separation from the bottom face of the foot and the bottom sole of the shoe.

14. An inspection system comprising:
a base configured to receive a foot of an individual covered by a shoe worn by an individual;
a thermal camera configured to acquire a thermal image of the shoe;
means configured to determine a position of the shoe relative to the thermal camera; and
a processor configured to determine, from the thermal image of the shoe, a lower limit of the foot, said lower limit corresponding to a lower face of the foot, and to deduce a distance between the lower face of the sole and the lower face of the foot from the position of the shoe relative to the thermal camera and from the lower limit of the foot.

15. The system according to claim 14, wherein the thermal camera is fixed to the base so as to acquire an image of a heel of the shoe.

16. The system according to claim 14, further comprising an additional thermal cameras configured to acquire an image of an additional shoe worn by the individual.

17. The system according to claim 14, wherein the thermal camera is sensitive to waves having wavelengths of about ten micrometers.

18. The system according to claim 14, wherein, when the base is placed on a floor, an angular field of the thermal camera is in a plane perpendicular to the floor and is larger than an angular field of the thermal camera in a horizontal plane parallel to the floor.

19. The system according to claim 14, wherein the thermal image is a bidimensional matrix comprising N lines of pixels and M columns of pixels, where N is greater than M.

20. The system according to claim 14, wherein the system comprises one or more of the following:
a mechanical stop that is fixed relative to the thermal camera and that is configured to come into contact with a part of the shoe;
a visual marking;
a set of photoelectric cells configured to send and/or receive an optic beam, said set of photoelectric cells being fixed on two opposite walls of the system and being configured to be positioned on either side of the shoe;
an array of antennas configured to send and/or receive a magnetic field, said array of antennas being fixed in a baseplate of the system;
at least one infrared sender configured to emit infrared waves, the at least one infrared receiver configured to receive the infrared waves, and
a device for analysing a round trip time of infrared waves between the infrared sender and the infrared receiver.

21. The system according to claim 14, wherein the thermal camera is sensitive to waves having wavelengths comprised between eight micrometers and fourteen micrometers.

22. A detection assembly comprising:
a base configured to receive a foot of an individual covered by a shoe worn by an individual;
a thermal camera configured to acquire a thermal image of the shoe; means configured to determine a position of the shoe relative to the thermal camera; and
a processor configured to determine, from the thermal image of the shoe, a lower limit of the foot of the individual, said lower limit corresponding to a lower face of the foot, and to deduce a distance between the lower face of the sole and the lower face of the foot from the position of the shoe relative to the thermal camera and from the lower limit of the foot; and at least one of:
a body scanner comprising detection means of a target object by means of one or more radiation energy modulated or emitted by a body of the individual;
a detector device comprising means adapted to detect stratification by vertical stacking, in the sole, by detection of successive echoes following emission of waves towards the sole; and,
measuring means of electrical capacitance formed by the sole of the shoe.

* * * * *